US010800601B2

(12) United States Patent
Francis et al.

(10) Patent No.: US 10,800,601 B2
(45) Date of Patent: Oct. 13, 2020

(54) FEEDER FOR A ROBOTIC WORKCELL

(71) Applicant: Elite Robotics, Camarillo, CA (US)

(72) Inventors: Zachary Francis, Oxnard, CA (US); Anthony Vanni, Thousand Oaks, CA (US)

(73) Assignee: Elite Robotics, Camarillo, CA (US)

(*) Notice: Subject to any disclaimer, the term of this patent is extended or adjusted under 35 U.S.C. 154(b) by 211 days.

(21) Appl. No.: 16/017,720

(22) Filed: Jun. 25, 2018

(65) Prior Publication Data

US 2019/0389652 A1 Dec. 26, 2019

(51) Int. Cl.
*B65D 83/26* (2006.01)
*B65D 88/26* (2006.01)

(52) U.S. Cl.
CPC .................. *B65D 88/26* (2013.01)

(58) Field of Classification Search
USPC ........................................... 221/164
See application file for complete search history.

(56) References Cited

U.S. PATENT DOCUMENTS 5,219,198 A * 6/1993 Davis ................. B25B 23/00
221/280
5,558,248 A * 9/1996 Sakoda ................. B23P 19/002
221/164

* cited by examiner

*Primary Examiner* — Gene O Crawford
*Assistant Examiner* — Ayodeji T Ojofeitimi
(74) *Attorney, Agent, or Firm* — Blue Sky Technical Advisors

(57) ABSTRACT

Methods and apparatus for the acceptance of loose components and feeding of individual components in a known position and orientation are disclosed.

11 Claims, 4 Drawing Sheets

DETAIL "A"

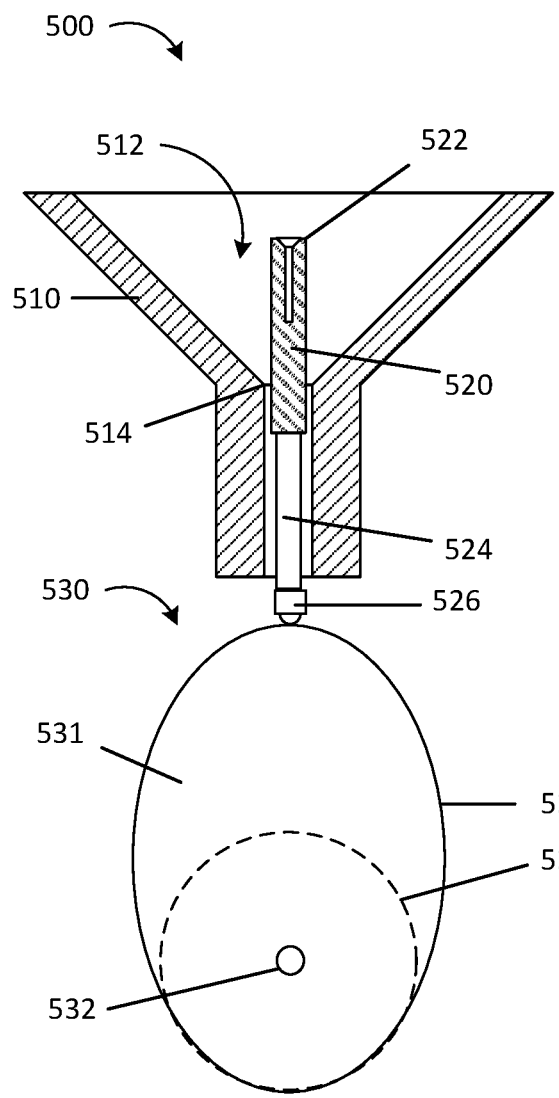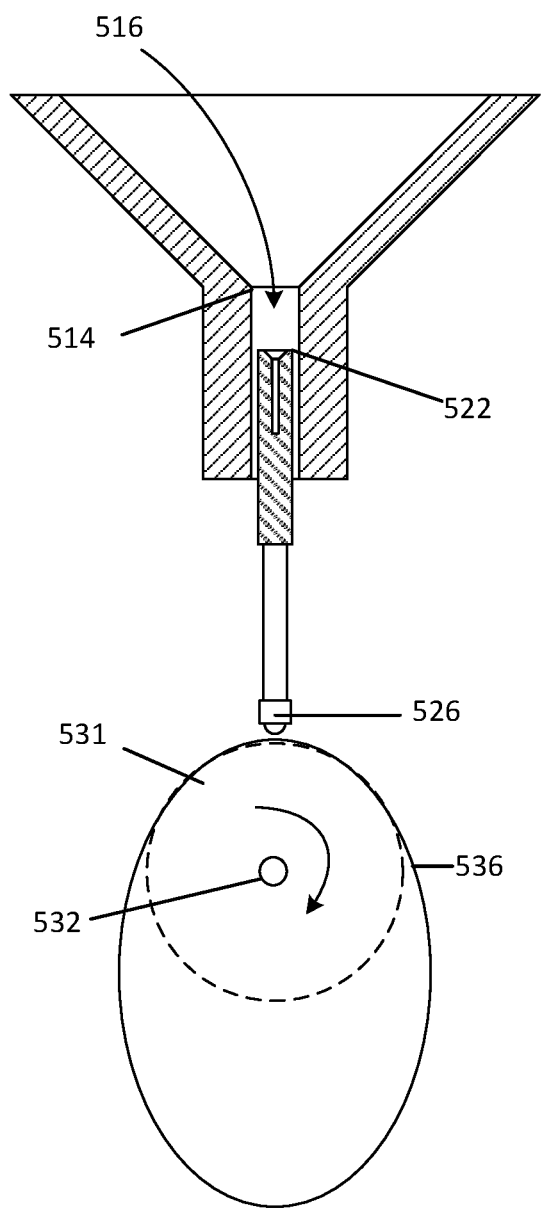
Figure 5A
Figure 5B

FEEDER FOR A ROBOTIC WORKCELL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

The present invention generally relates to accepting a quantity of loose components and orienting and feeding them in a known orientation.

Description of the Related Art

Processing equipment requires parts to be supplied at a defined location in a defined orientation in order to be utilized by the equipment. For example, a simple cam-driven corker, which inserts corks into wine bottles after filling, requires the corks and bottles to be provided in specific locations for the process to function.

Vibratory feeders are a traditional method for accepting loose components and providing them in a known orientation at a known location. The parts are loaded into a bin and a ramp leads in a spiral path from the bin to the desired feed location. The entire bin is vibrated to cause the parts to move in the direction that leads along the path. Along the path, various holes and wedges force parts that are not in the right orientation to fall back into the bin. A vibratory feeder tends to be big, noisy, expensive to design. The primary drawback is that each vibratory feeder is designed to accommodate a single size and type of component.

Tape-and-reel is a known technique for providing components. The components are affixed to a tape substrate at intervals. The tape is then wound onto a reel that can be mounted onto a feeder that advances the tape until the next part is in the desired feed location. The drawback is the effort required to supply components in a tape-and-reel configuration and many parts are not used in quantities that justify the expense to provide them on reels.

SUMMARY

What is needed is a simple and adaptable method of accepting loose components and providing them one at a time in a known location and orientation. The invention described herein fulfills this need.

In an aspect, the present disclosure provides for, and includes, an apparatus for feeding a component to a robot, wherein the apparatus comprises a hopper and a piston configured to reciprocate with respect to the hopper, wherein the piston has a receptacle at the upper end and is configurated to accept a component in a determined orientation.

In an aspect, the present disclosure provides for, and includes, a method of feeding a component to a robot that comprises the steps of placing a plurality of components in a bin having a bottom, lowering a piston within a channel that passes through the bottom of the bin until a top of the piston is below the bottom of the bin, allowing one of the plurality of components to fall into the channel and then into a receptacle that is formed into the top of the piston, and raising the piston until the top of the piston is at a determined position.

BRIEF DESCRIPTION OF THE DRAWINGS

Aspects of the disclosure are herein described, by way of example only, with reference to the accompanying drawings. With specific reference now to the drawings in detail, it is stressed that the particulars shown are by way of example and are for purposes of illustrative discussion of aspects of the disclosure. The description and the drawings, considered alone and together, make apparent to those skilled in the art how aspects of the disclosure may be practiced.

FIGS. 5A-5B depict the operation of an actuator for moving the piston of an example feeder, according to certain aspects of the present disclosure.

DETAILED DESCRIPTION

Figure 1:
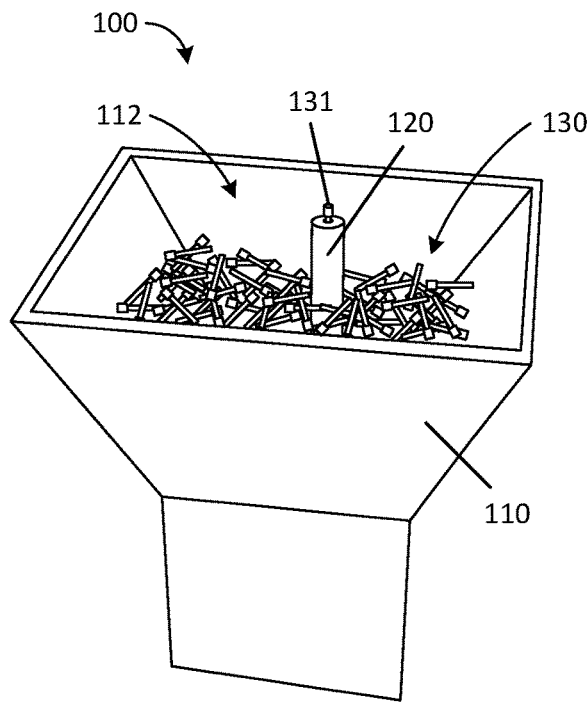
FIG. 1 depicts an exemplary feeder containing components, according to certain aspects of the present disclosure.

This description is not intended to be a detailed catalog of all the different ways in which the disclosure may be implemented, or all the features that may be added to the instant disclosure. For example, features illustrated with respect to one embodiment may be incorporated into other embodiment, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. In other instances, well-known structures, interfaces, and processes have not been shown in detail in order not to unnecessarily obscure the invention. It is intended that no part of this specification be construed to affect a disavowal of any part of the full scope of the invention. Hence, the following descriptions are intended to illustrate some particular embodiments of the disclosure, and not to exhaustively specify all permutations, combinations and variations thereof.

Unless otherwise defined herein, all technical and scientific terms used herein have the same meaning as commonly understood by one of ordinary skill in the art to which this disclosure belongs. The terminology used in the description of the disclosure herein is for the purpose of describing particular aspects or embodiments only and is not intended to be limiting of the disclosure.

All publications, patent applications, patents and other references cited herein are incorporated by reference in their entireties for the teachings relevant to the sentence and/or paragraph in which the reference is presented. References to techniques employed herein are intended to refer to the techniques as commonly understood in the art, including variations on those techniques or substitutions of equivalent techniques that would be apparent to one of skill in the art.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

The methods disclosed herein include and comprise one or more steps or actions for achieving the described method. The method steps and/or actions may be interchanged with one another without departing from the scope of the present disclosure. In other words, unless a specific order of steps or actions is required for proper operation of the embodiment, the order and/or use of specific steps and/or actions may be modified without departing from the scope of the present disclosure.

As used in the description of the disclosure and the appended claims, the singular forms "a," "an" and "the" and the like are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

The terms "about" and "approximately" as used herein when referring to a measurable value such as a length, a frequency, or a position and the like, is meant to encompass variations of ±20%, ±10%, ±5%, ±1%, ±0.5%, or even ±0.1% of the specified amount.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

As used herein, the term "partially" is intended to include a portion of a feature, wherein the portion is greater than zero and may be up to 100% of the feature, i.e. include the entire feature. The portion of the feature that is included may include non-contiguous elements. The included portion need not be defined by the disclosed configuration of the feature nor does the included portion need to start at an end or surface.

As used herein, the term "component" is intended to include any product that can be provided in loose, bulk quantities. This specifically includes nails of all sizes, threaded fasteners, rivets, pins with and without heads, axially symmetric bodies having a plurality of sections with different profiles and/or diameters, axially symmetric bodies of any aspect ratio, and articles having a defined but arbitrary form.

As used herein, the term "reciprocate" is intended to include all types and paths of repetitive motion between a first position and a second position. This may include rotation of an element and/or translation as the positions may be defined in location and orientation. The paths may be linear or curved in two or three dimensions and may extend beyond the first and second positions.

As used herein, the phrase "line of motion" is intended to describe a path of a reference point on an object. A line of motion may be aligned with a reference feature of the object or at an angle to the reference feature. A line of motion may be linear or curved in two or three dimensions. An object moving along a line of motion may at the same time rotate with respect to the line of motion.

FIG. 1 depicts an exemplary feeder 100 containing components 130, according to certain aspects of the present disclosure. The components 130 are placed randomly in bin 112 of hopper 110. A piston 120 passes vertically, in this example, through the bin 112. A single component 131 is shown positioned within a receptacle (not visible in FIG. 1) formed in the top of the piston 120. The top of the piston 120 is raised above the surface of the bulk components 130 such that the component 131 is easily accessible at a defined position and in a defined orientation.

Figure 2A:
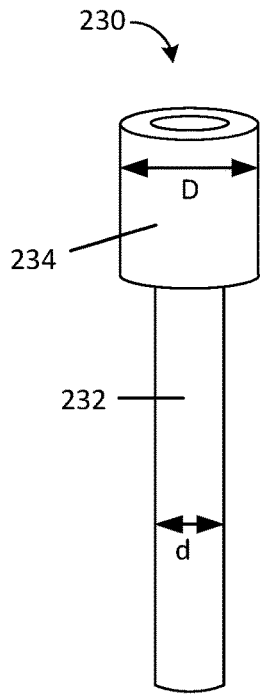
FIGS. 2A and 2B show an example component.
Figure 2B:
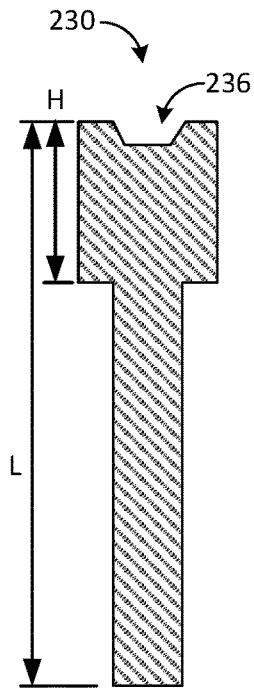

FIG. 2A is a perspective view of an example component 230 while FIG. 2B is a cross-section of the same example component 230. This example component has a shaft 232 with a diameter "d" and a head 234 with a diameter "D" that is greater than diameter "d." The head 234 has a height "H" while component 230 has an overall length "L."

In certain embodiments, the component 230 has a recess 236 formed in the head 234. In the example of FIGS. 2A-2B, the recess 236 is round with tapered sides and a flat bottom. In other embodiments, this recess 236 may be any of a hex receptacle, a Philips head receptacle, a star receptacle, or a slot, or other feature. In certain embodiments, the component 230 lacks a recess 236. In certain embodiments, the shaft 232 is smooth while in other embodiments, one or both of the shaft 232 and head 234 are one of threaded, knurled, grooved, or otherwise formed. The invention described herein is suitable for handling components having any one or more of these features.

Figure 3A:
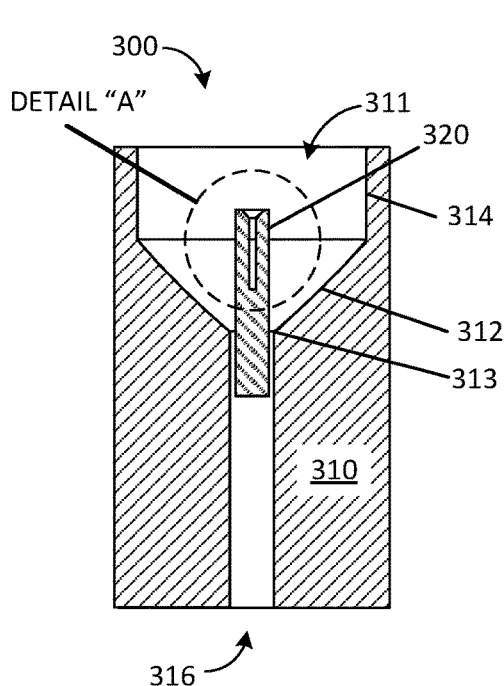
FIGS. 3A-3C are cross-sections of an example feeder, according to certain aspects of the present disclosure.

FIG. 3A is a cross-section of an example feeder 300 showing a hopper 310 with bin 311 having a bottom 312 and a channel 316 passing through the bottom 312. The bin 311 also has, in this embodiment, sides 314 that may be absent in other embodiments. In this example, the bottom 312 is inclined toward the channel 316. The lowest point of the bottom 312 is the rim 313 of the channel 316. In certain embodiments, the bottom 312 may be horizontal or at a small angle. A piston 320 is shown partially disposed within channel 316. The details of the top portion of piston 320, indicated by the dashed circle "A," are shown in FIG. 3B.

Figure 3B:
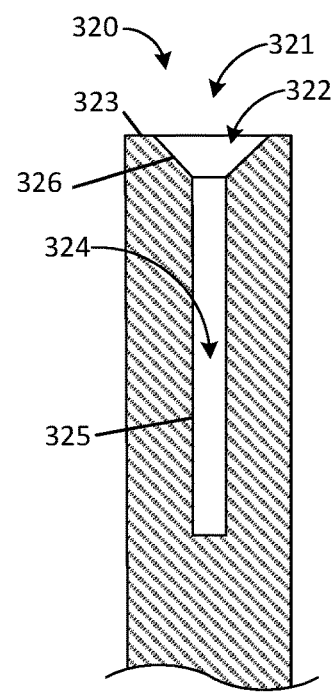

FIG. 3B depicts a receptacle 321 formed in the upper end 323, e.g. the top surface, of piston 320. In this exemplary embodiment, the receptacle 321 comprises a transition portion 322 having sloped sides 326. Connected to the bottom of the transition is an alignment portion 324 having a wall 325. In this example, the transition and alignment portions are circular in plan view (not shown) and generally smooth. In this example, the sloped sides 326 have an angle that is in the range of 20-70 degrees, preferably in the range 30-60 degree, and more preferably in the range of 40-50 degrees. In certain embodiments, the transition portion may one or more sub-portions, wherein a sub-portion may have a non-flat profile and includes a surface at an angle in the range of 0-90 degrees. The diameter of the top opening of the transition portion 322 and the angle of the sloped sides 326 are chosen to provide a large area of engagement for the tip of a falling component and to guide that tip downward toward the alignment portion 324. In this embodiment, there is a horizontal portion remaining between the transition portion 322 and the outer diameter of the piston 320 in upper end 323.

In certain embodiments, the receptacle 321 is formed partially in a side surface of the piston 320. In certain embodiments, the receptacle 321 comprises features, for example a slot (not shown), that passes through a side of the piston 320.

Figure 3C:
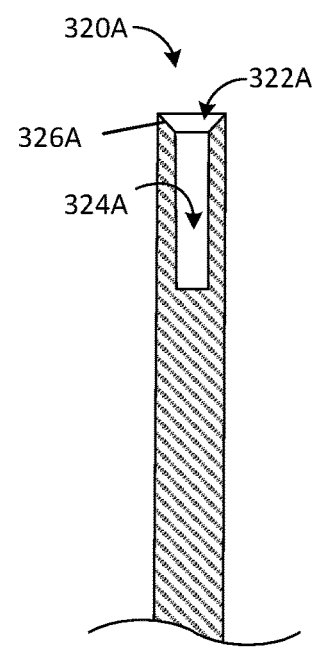

FIG. 3C depicts a partial view of another embodiment 320A of a piston wherein the top opening of the transition portion 322A is approximately coincident with the outer diameter of the piston 320A and the ratio of the depth of the alignment portion 324A to the depth of the transition portion 322A is lower than the corresponding ratio of alignment portion 324 to transition portion 322.

Figure 3D:
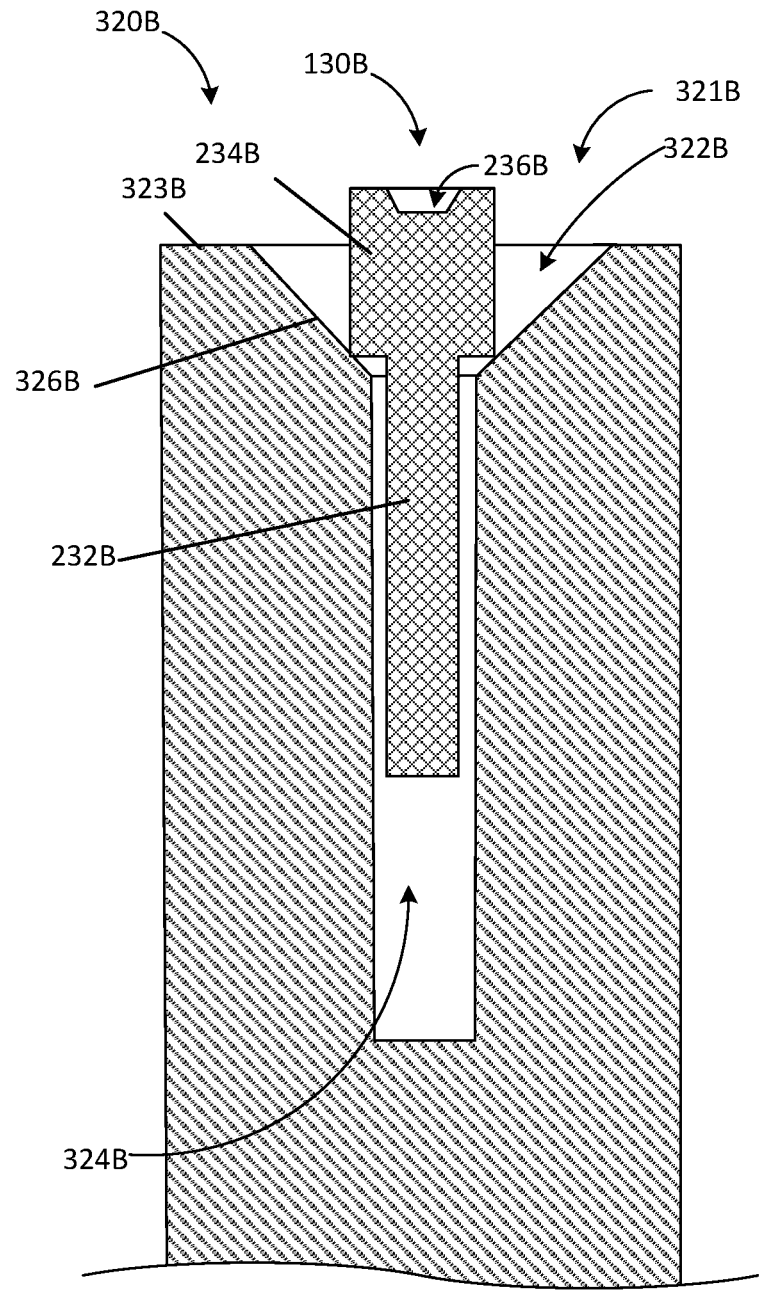
FIG. 3D is a partial cross-section of an example component positioned in an example receptacle, according to certain aspects of the present disclosure.

FIG. 3D is a partial cross-section of an example component 130B positioned in an example receptacle 321B of piston 320B, according to certain aspects of the present disclosure. In this example, the features are axisymmetric, although in other embodiments the features may be square or other form. The shaft 232B of the component 320B is positioned within the alignment portion 324B. As the depth of the alignment portion 324B is deeper than the length of the shaft 232B, and the head 234B diameter is too large to fit into the alignment portion 324B, the component 130B has descended into the receptacle as far as possible and the lower edge of the head 236B is resting on the sloped sides 326B. In this embodiment, the top of head 234B is raised above the top surface 323B of the piston 320B and is accessible to be griped on the sides of head 236B. In certain embodiments, slots (not shown in FIG. 3D) may be cut from the outer sides of piston 320B to the receptacle 321B such that a gripper may come in through the slots to grip the component. In other embodiments, a gripper such as a vacuum pickup may approach the component 130B from directly overhead and attach to the top surface 323B or the recess 236B to retrieve the component from the feeder 100.

In designing a receptacle 321B for use with a particular component 130B, the diameter of the alignment portion 324B must be less than the diameter of the head 234B yet allow the maximum amount of lateral for the shaft 232B, as gravity will draw the shaft 232B further into the alignment portion 324B. The further the shaft 232B is engaged with the alignment portion 324B, the more closely aligned the two become. The width of the flat surface 323B of the top of the piston 320B should be minimized to avoid the tip of a descending component catching on the ledge and not progressing into the transition portion 322B. The angle of the sloped sides 326B may require some experimentation to find the proper combination of slope and depth of the transition portion 322B, as well as the material and surface finish of the sloped sides 326B, to ensure that the tip of a component 130B slides easily down the sloped sides 326B and into the alignment portion 324B.

Receptacles may be designed for components that, with reference to FIGS. 2A and 3B, do not have a head 234 that is wider than the shaft 232, in which case the depth of alignment portion 324 should be adjusted to be less than the length of the shaft 232 such that the shaft 232 will bottom out in the alignment portion 324 while still protruding above the top surface 323 of the piston 320, or at least high enough to be accessible by a robot gripper.

While this invention is well suited to components having a head and a shaft, for example smooth pins and socket head cap screws, the concept is also applicable to components having other form and aspect ratios. A hex nut, for example, can be captured through a slot with a gap matching the thickness of the nut and a tapered alignment portion in the form of a pocket of a matching profile to the nut. Even a spherical ball bearing can handled with a receptacle that includes an alignment portion formed as a spherical pocket having a depth of approximately half the diameter of the ball. The important aspect to take advantage of the constrained motion of the components as they fall into the channel from the bin and provide a transition portion that guides the component to properly enter the alignment portion.

An important aspect of the receptacle design is to ensure that any component that does not fully descend into the alignment portion 324 fall off the piston 320 as the piston is moved upward and extends above the mass of loose components 130. Once support from the channel wall is removed, all non-engaged components must fall away such that the receptacle is clear for another cycle of motion.

Figure 4A:
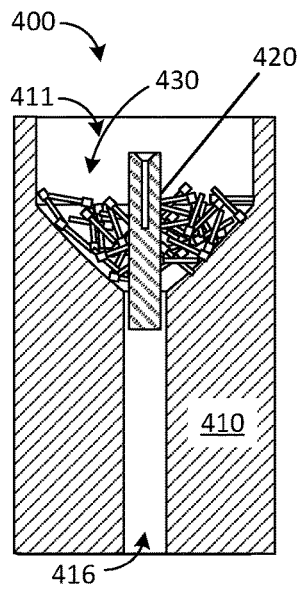
FIGS. 4A-4F depicts steps in the operation of an example feeder, according to certain aspects of the present disclosure.

FIGS. 4A-4F depicts steps in the operation of an example feeder 400, according to certain aspects of the present disclosure. In FIG. 4A, piston 420 is in a first position wherein the top of piston 420 is raised above the bulk of the loose components 430 that are contained in bin 411 of hopper 410. The sides of piston 420 extend into the channel 416 thereby preventing components 430 from falling into the channel 416.

Figure 4B:
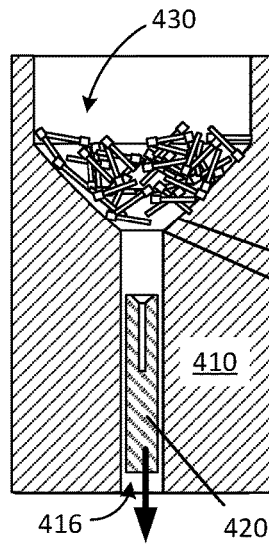

In FIG. 4B, the piston 420 has been lowered to a second position wherein the top of the piston 420 is below the bottom 412 of the bin 411. In certain embodiments, the top of the piston 420 is below the lowest point 413 of bottom 412.

At this point, a disturbance force (not shown) is applied to the hopper 410 to cause the components 430 to shift position such that a portion of the components 430 drop into the open top of channel 416. This disturbance force may be created by any of a number of known methods of imparting force to or creating motion of the hopper 410, including cam driven actuators (not shown) that physically move the hopper 410, electromagnets that attract ferrous components 430 when activated, linear solenoids (not shown) that apply an impulse of energy to the hopper 410, continuous oscillation driven by a spring-mass system (not shown), or other means of imparting mechanical energy or motion to the hopper 410. In certain embodiments, a disturbance force is applied to the hopper 410 at times other than between the steps of FIGS. 4B & 4C. In certain embodiments, a disturbance force is continuously applied to the hopper 410, for example with a small shaker or resonant solenoid. In certain embodiments, a disturbance may be applied directly to the plurality of components, for example with a stirring mechanism (not shown) that mechanically moves a portion of the components. In certain embodiments, the application of a disturbance force is omitted and the motion of piston 420 is sufficient by itself, or with additional short up-down motions during the piston's descent, to cause components 430 to fall into channel 416. In certain embodiments, the components 430 are encouraged to fall into the channel 416 by a displacement of hopper 410.

Figure 4C:
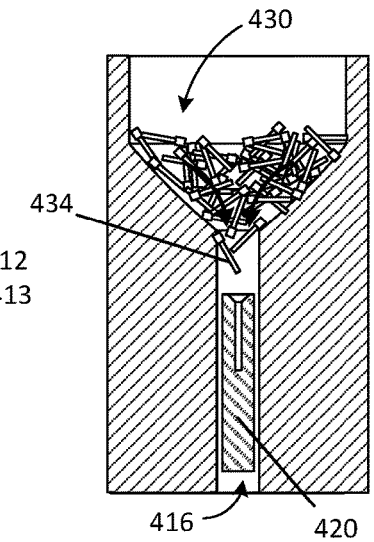

FIG. 4C depicts a single component 434 that is falling into the channel 416, along with other components, as a result of a disturbance applied to hopper 410. As the component 434 descends, a leading edge of falling component 434 engages, with reference to FIG. 3D, the transition portion 322B of the receptacle 321B that guides the leading edge of component 434 into alignment portion 324B as the component 434 continues to fall. Once the leading edge of component 434 enters the alignment portion 324B, gravity will pull the component 434 further downward into full engagement with receptacle 321B. There will be a general motion of the plurality of components 430 toward the opening of channel 416, as indicated by the arrows, as the lowering of piston 420 left a vertical hole in the mass of components 430. Components 430 whose leading edge does not engage the alignment portion falls off the piston 420 as the piston 420 is raised.

Figure 4D:
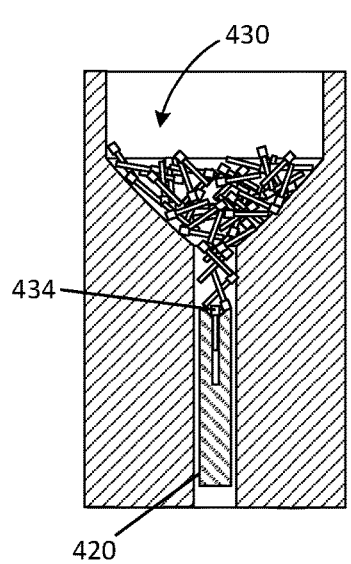

FIG. 4D illustrates component 434 having fallen into the channel 416 in the step of FIG. 4C and then into a receptacle that is formed into the top of the piston 420. With reference to FIG. 3D, the head of component 434 is resting on the sloped sides of the transition portion of the receptacle. This positions the head at a known height above the top surface, in this example, of the piston 420.

Figure 4E:
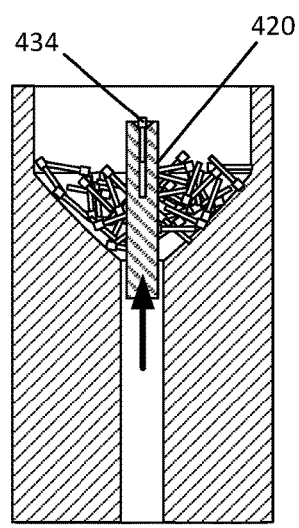

In FIG. 4E, piston 420 is raised to the first position. The component 434 remains in the receptacle of piston 420, as there is no dislodging force applied by this motion. The plurality of components 430 that had moved to fill the top of the channel 416 are pushed out of the way as the piston 420 rises.

A component 434 that is accepted into the receptacle of piston 420 will remain in the receptacle while the piston 420 is raised. Components 430 that are not accepted into the receptacle fall off the piston 420 as the piston 420 is raised.

Figure 4F:
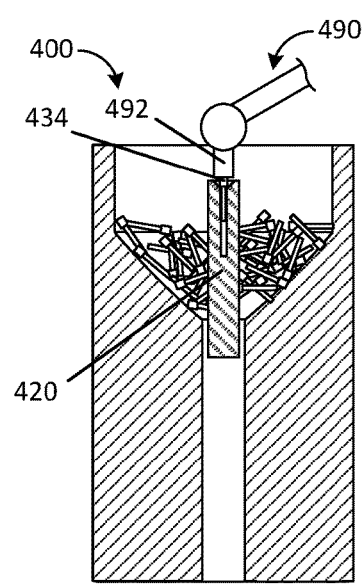

FIG. 4F depicts a robot arm 490 attaching a gripper 492 to the component 434 in preparation for removing the component 434 from the feeder 400. As the component 434 is in a determined position and in a determined orientation, the robot arm 490 can reliably and repeatedly connect the gripper 492 to the component 434.

In the example sequence of FIGS. 4A-4F, the channel 416 is shown as vertical and passing through the center of bin 411. In other embodiments, the channel 416 may be oriented at an angle to the vertical and through a position in the bin that is spaced apart from the center of the bin. In certain embodiments, the angle of channel 416 may be up to 45 degrees from vertical while in other embodiments it may exceed 45 degrees. In certain embodiments, the channel 416 may pass through a corner or an edge of the bin 411.

The method of operation of the feeder 400 includes the steps of allowing components 430 to fall into channel 416 and then into a receptacle formed in a top of piston 420 that is positioned within the channel 416.

FIGS. 5A-5B depict the operation of an actuator 530 for moving the piston 520 of an example feeder 500, according to certain aspects of the present disclosure. FIG. 5A depicts the actuator 530 configured to place the piston 520 in a first position within bin 512. The eccentric cam 531 rotates about center 532. The surface 536 of the cam 531 changes its radial distance from center 532 around the perimeter, with a minimum radius equivalent to a small diameter shown as the dashed circle 534. In the position of FIG. 5A, the follower 526 is contacting the surface 536 at the maximum radial distance from the center 532 and this position is therefore the maximum upward position of the piston 520.

In FIG. 5B, the cam 531 has rotated approximately 180 degrees such that the follower 526 is contacting the surface 536 at the minimum radius of circle 534. The piston 520 has therefore been lowered to a second position that is withdrawn down channel 516. The top surface 522 of the piston 520 is below the bottom 514 of the bin 512.

The cam mechanism of FIGS. 5A-5B is merely an exemplary implementation of an actuator configured to move the piston 520 between the first position of FIG. 5A and the second position of FIG. 5B. In certain embodiments, the cam 531 will have a different profile, for example an outward ramp leading to an inward step. In certain embodiments, this motion is induced using any known actuator such as linear motion actuators, including screw drives, linear motors, mechanical resonant oscillators, and 4-bar linkages.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but are to be accorded the full scope consistent with the claims language.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference without limiting their orientation in other frames of reference.

Although the relationships among various components are described herein and/or are illustrated as being orthogonal or perpendicular, those components can be arranged in other configurations in some embodiments. For example, the angles formed between the referenced components that are shown or discussed only as a 90 degree angle can be greater or less than 90 degrees in some embodiments.

Although various components are illustrated as being flat and/or straight, those components can have other configurations, such as curved or tapered for example, in some embodiments. For example, a conical surface that is shown in cross-section as having a flat profile may have, in certain embodiments, curvature or discontinuities along that profile.

Pronouns in the masculine (e.g., his) include the feminine and neuter gender (e.g., her and its) and vice versa.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

We claim:

1. An apparatus for feeding a component to a robot, comprising:
   a hopper, and
   a piston configured to reciprocate with respect to the hopper, the piston comprising:
      a receptacle configured to accept a component in a determined orientation, and
      a first position selected such that a component accepted in the receptacle will be in a determined position when the piston is in the first position,
   wherein the receptacle is configured to allow the robot to retrieve the component from the determined position when the piston is in the first position.

2. The apparatus of claim 1, wherein the receptacle is disposed at an upper end of the piston.

3. The apparatus of claim 1, wherein the receptacle is configured to allow the robot to retrieve the component from the receptacle.

4. The apparatus of claim 1, wherein:
   the hopper comprises a bin having a bottom and a channel that passes through the bottom of the bin and is configured to allow the piston to reciprocate within the channel, and
   the piston comprises an upper end and a second position where the upper end of the piston is below the bottom of the bin.

5. The apparatus of claim 1, wherein the piston is configured to reciprocate along a line of motion that is within 45 degrees of vertical.

6. The apparatus of claim 5, wherein the piston is configured to reciprocate vertically.

7. The apparatus of claim 1, wherein the receptacle comprises:
   a transition portion, and
   an alignment portion.

8. The apparatus of claim 1, further comprising:
   a first actuator configured to move the piston between the first position and a second position, and
   a second actuator configured to apply a brief upward force to the hopper.

9. A method for feeding a component to a robot, comprising the steps of:
   placing a plurality of components in a bin having a bottom,
   lowering a piston within a channel that passes through the bottom of the bin until an upper end of the piston is below the bottom of the bin,
   applying a brief upward force to the bin,
   allowing one of the plurality of components to fall into the channel and then into a receptacle that is formed in the upper end of the piston, and
   raising the piston until the component is in a determined position.

10. The method of claim 9, wherein the receptacle is configured such that the component being accepted into the receptacle is guided into a determined configuration.

11. The method of claim 9, further comprising the step of:
    allowing a robot to remove the component from the receptacle.

* * * * *